United States Patent Office

2,865,869
Patented Dec. 23, 1958

2,865,869

COMPOSITION COMPRISING AN ALKYD RESIN, ORGANIC POLYISOCYANATE AND A TERTIARY ALCOHOL - CONCENTRATED ACID FOAMING AGENT AND METHOD OF PREPARING CELLULAR RESIN THEREFROM

Raymond R. Hindersinn, Lewiston, and Stephen M. Creighton, Niagara Falls, N. Y., assignors to Hooker Chemical Corporation, Niagara Falls, N. Y., a corporation of New York No Drawing. Application November 23, 1956
Serial No. 623,796

22 Claims. (Cl. 260—2.5)

This invention relates to the production of polyurethane foams, and more particularly refers to a chemical system and to a method for producing such foams.

The rigid plastic foams have found wide and varied use in industry. For instance, they may be used as core materials between skins of many and varied compositions. In aircraft construction the foam may be enclosed between aluminum or fiber glass reinforced plastic skins to form an assembly which is rigid, strong and yet remarkably light. Because of their excellent electrical properties polyurethane foams enclosed by fiber glass reinforced plastic skins have also found use in the construction of radomes. The polyurethane foams have another useful property, they develop a high degree of adhesion during the foaming process. As a result they will adhere to skins composed of such varied materials as metals, plastics, ceramics, glass, etc. The resulting sandwich-type assemblies lend themselves well for use in such diverse fields as in the construction and insulation industries.

The rigid plastic foams can also be utilized without skins as insulating materials to surround hot water or steam pipes, valves, etc. Their utility for such applications is enhanced by their ability to be applied, foamed, and used in situ.

The rigid plastic foams have many desirable properties. They have great structural strength coupled with low density. In sandwich-type constructions they exhibit a high degree of rigidity, a property particularly desirable for building purposes. They are excellent vibration dampers and may thus support high resonant loads. Because of their fine cell structure they are excellent heat and sound insulators. The foam cells may be made very fine and uniform, so that the cells are tough and non-brittle and hence highly resistant to rupturing.

In our copending application Serial No. 623,795 filed of even date there is disclosed a fire resistant plastic foam. This foam is prepared by first producing a combined-halogen-containing alkyd resin, and subsequently reacting the alkyd resin with a polyisocyanate in the presence of a foaming system. The foam produced thereby has excellent physical properties, and in addition is immediately self-extinguishing when a flame initially applied thereto is removed.

The method most commonly used for foaming polyisocyanate resins at present is to add a small amount of water to the foamable mixture. The water reacts with the isocyanate in the following manner:

$$RNCO + H_2O \rightarrow RNH_2 + CO_2$$

This reaction results in the liberation of carbon dioxide gas which expands the resin as it cures to form a foam. The reaction is best carried out at or near room temperature because of the exothermic nature of the reactions involved.

Since many of the combined-halogen-containing alkyd resins produced in the above described invention are solids at room temperature, it is necessary to transform them to the liquid state before they can be foamed. This is preferably accomplished by applying heat to the alkyd until a temperature is reached at which the alkyd has a suitable fluidity. The temperature at which a suitable fluidity is reached can be lowered by the inclusion of plasticizing substances, among which are such substances as chlorinated esters of fatty acids, phosphate esters, etc. Alternatively the alkyd viscosity may be reduced by suitable solvents such as ketones, aromatic hydrocarbons or chlorinated hydrocarbons.

If foaming is carried out at elevated temperatures, the presence of water, which is the conventional foaming agent known to the art, is not entirely suitable or desirable because of difficulties of controlling the reaction. Consequently the foaming methods of the prior art are not suitable for foaming the alkyds having high melting points.

It is an object of the present invention to provide a foaming system for the production of polyurethane foams which may be used to produce foams of low density and excellent physical properties. It is a further object to provide such a system wherein an alkyd resin may be foamed which is in a substantially anhydrous state. It is a further object to provide a foaming system in which the foaming process may be easily controlled, and which is operative over a wide range of temperatures, particularly temperatures elevated above room temperature. It is a further object to provide a foaming method wherein foams of unusually low density may be produced by the used of a relatively small amount of foaming agent. It is still a further object of this invention to provide such a foaming system which may be used with combined-halogen-containing alkyd resins at elevated temperatures to produce polyurethane foams having excellent mechanical properties, and which in addition are fire-resistant. Further objects and advantages of the invention will appear more fully from the following description.

It has now been found that a mixture of an alkyd resin, especially a combined-halogen-containing alkyd resin, and a polyisocyanate may be foamed at elevated temperature conditions and at rates which may be carefully controlled by using as a foaming agent a system comprising a tertiary alcohol having the formula:

$$R_1-\underset{\underset{OH}{|}}{\overset{\overset{R_2}{|}}{C}}-R_3$$

where $R_1$ is an aliphatic group containing at least one hydrogen atom bonded to the carbon atom immediately adjacent to the carbinol group and $R_2$ and $R_3$ are substituents selected from the group consisting of aliphatic and aromatic groups; and a catalytic amount of a concentrated acid.

Among the tertiary alcohols which may be used as the foaming agent of the present invention are the following: tertiary butyl alcohol, tertiary amyl alcohol, 2-ethyl-2-butanol, 2-ethyl-2-pentanol, 2-methyl-2-pentanol, 3- methyl-3-hexanol, 4-methyl-4-heptanol, 4-propyl-4-heptanol, 4-ethyl-4-heptanol, 2,3-dimethyl-3-butanol, 2,3-dimethyl-3-pentanol, 2,3,4-trimethyl-3-pentanol, 3-ethyl-2,4-dimethyl-3-pentanol, 3-isopropyl-2,4-dimethyl-3-pentanol, terpinol, etc. Unsaturated tertiary alcohols may also be used. Among them are: 2-methyl-3-butyn 2-ol, 3-methyl-1-pentyn-3-ol, 3,5-dimethyl-1-hexyn-3-ol, 2-methyl-1-pentyn-3-isopropyl-4-pentyn-3-ol, 1-ethynyl-1-cyclohexanol, 2-ethyl-3-pentene-2-ol, 2-methyl-4-pentene-2-ol, 4-methyl-1-heptene-4-ol, 2,4 - dimethyl-3-isopropyl-4-pentene-2-ol, alpha-terpineol, etc. Among the aryl-alkyl tertiary alcohols falling within the general formula of the present invention are: 1-methyl-1-phenylethanol, 1,1-diphenylethanol, 1-methyl-1,2-diphenylethanol, 1,2 - dimethyl-1,2-diphenylethanol, 2-methyl-1,1,2 triphenylethanol, etc. In addition aromatic tertiary alcohols such as 1,1,2,2-tetraphenylethanol may also be used.

The amount of blowing agent used is not critical, but will be dictated by the type of foam desired. If a very dense foam is desired, only a small amount need be used. If a very light foam is desired a maximum amount should be used. The amount used will also depend upon the particular foaming agent. It has been found that 1.6 grams of a foaming agent of the present invention such as tertiary amyl alcohol is sufficient to foam a total ingredient mixture of 35 grams to form a fire-resistant foam having a density of 2.0 to 2.5 pounds per cubic foot.

The effectiveness of the alcohols used as the foaming agents is increased by the presence of a small amount of a concentrated acid. Among the acids which may be used as the catalyst in the present invention are the following inorganic acids: sulfuric acid, phosphoric acid, nitric acid, polyphosphoric acid, chlorosulfonic acid, hydrochloric acid, etc. Strong organic acids such as the following may also be used: paratoluene sulfonic acid, benzene sulfonic acid, naphthalene sulfonic acid, 2-naphthalene sulfonic acid, picric acid, trichloroacetic acid, trifluoroacetic acid, etc. Lewis-type acids such as aluminum chloride, boron trifluoride, boron trichloride, etc. may also be used. It is desirable that the acid be concentrated and not contain an appreciable amount of water since the water will tend to react with the isocyanate, although this fact does not prevent the use of such aqueous acids. The amount of the strong acid used as a catalyst to dehydrate the foaming agent is not critical. It may be varied in amount from about 0.04 gram to about 0.5 gram per gram of tertiary alcohol used. Generally an amount up to 1.5 percent by weight based on the total foaming composition will give excellent results. Larger amounts may be used, but the additional amount will not be of any appreciable benefit, and may even have an unfavorable effect on the strength of the cured foam.

The present foaming agents have many advantages over those of the prior art. First, they are soluble in the alkyd resin and consequently may be introduced therein to form a homogeneous mixture before the foaming action begins. Second, because the foaming action is very easily controlled and is not as rapid at high temperatures as those utilizing water, alkyd resins may be foamed which are normally solid at room temperature. The foaming method of the present invention, although it may be used to produce various types of foams, is especially useful for producing a foam from alkyds which contain combined halogen. The foams thus produced have extremely fine structure, good physical properties and are fire-resistant.

An additional advantage in the use of the present foaming method is the great reduction in the heat liberated during the foaming process. When the conventional foaming methods are used for producing rigid polyurethane foams having a density of less than 4 pounds per cubic foot, charring will occur if the foam rise is greater than about 3 inches. A foam rise in excess of 12 inches can be carried out by the method of this invention with no perceptible charring in the foam interior. Another advantage of the new foaming technique is that it permits the elimination of the various foam stabilizing agents commonly used.

The alkyd resin used to produce polyurethane foams by our present method is generally the reaction product of a polyhydric alcohol with a polycarboxylic acid. Among the polycarboxylic acids which may be used to form the alkyd are maleic acid, fumaric acid, phthalic acid, 1,4,5,6,7,7-hexachlorobicyclo-(2.2.1)-5-heptene-2,3-dicarboxylic acid, tetrachlorophthalic acid, 1,4,5,6-tetrachloro-7,7-difluorobicyclo-(2.2.1)-5-heptene - 2,3 - dicarboxylic acid, and aliphatic acids such as oxalic, malonic, succinic, glutaric, adipic, etc.

In order to obtain a satisfactory rigid foam, at least a portion of the total polyhydric alcohol component must consist of a polyhydric alcohol containing at least three hydroxyl groups. This is necessary in order to provide a means for branching the alkyd. Where an even more rigid finally-cured structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, propylene glycol, etc. may also be used. Among the polyhydric alcohols which may be used are glycerol, hexane triol, butane triol, trimethylol propane, trimethylol ethane, pentaerythritol, etc. The ratio of the polyhydric alcohol such as glycerol to the polybasic acid may be expressed as the hydroxyl-carboxyl ratio, and this ratio may be varied over a wide range. However, the preferred range is 1.6 to 1, to 2.0 to 1 for the best compressive strength.

A large number of various polyisocyanates may be used. The aromatic polyisocyanates are more reactive and less toxic than the aliphatic members, and are consequently preferred. The compounds which are at present most readily available commercially are 2,4-tolylene diisocyanate, 2,6-tolylene diisocyanate and mixtures thereof. However, others may be used, among them methylene-bis-(4-phenyl isocyanate), 3,3'-bitolylene-4,4'-diisocyanate, 3,3' - dimethoxy - 4,4' - biphenylene diisocyanate, naphthalene-1,5-diisocyanate, etc. Most of the examples of the present invention were carried out utilizing Nacconate 80, a mixture containing 80 percent of 2,4-tolylene diisocyanate and 20 percent of 2,6-tolylene diisocyanate, since the material is readily available. However, this is not to be considered in any way as limiting the scope of the invention.

The polyisocyanate concentration may be varied from about 30 to 130 percent of isocyanate groups with respect to the sum of the alkyd and foaming agent based on the number of hydroxyl and carboxyl groups in each. The foams obtained with the higher concentration are resilient but the resiliency decreases with increasing amounts of diisocyanate above 100 percent. The foams made with the 30 percent are very brittle. The preferred range for the foam of the present invention is about 85 to about 115 percent.

The amount of blowing agent used is not critical but will be dictated by the type of foam desired. If a very dense foam is desired only a small amount need be used. The amount used will also depend upon the type of foaming agent. When using a foaming agent comprised of a tertiary alcohol such as tertiary amyl alcohol, it has been found that 1.6 grams is sufficient to foam a total ingredient mixture of 35 grams to produce a fire-resistant foam having a density of 2.0 to 2.5 pounds per cubic foot. Additional foaming agent may be used if desired.

It is often desirable to incorporate additionally a proportion of an aliphatic acid into the alkyd resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic may also be used.

There are a number of ways in which the various components of the foaming mixture can be introduced. In one method the alkyd resin or the mixture of the alkyd resin and a diluent is added to one tank, and heated and stirred to a homogeneous viscous mass, with the temperature remaining in the vicinity of 85 to 115 degrees centigrade. The diisocyanate is added to a second tank maintained at room temperature. The third tank contains a solution of the mineral acid catalyst in the particular alcohol to be used as the foaming agent. These three components are continuously metered into a mixer in the desired proportions. The temperature of the mixture is maintained at about 60 to 80 degrees centigrade. This foaming mixture is fed directly into a reaction zone where it is allowed to react at temperatures varying from 40 to 60 degrees centigrade for periods of time varying from 3 to 40 minutes. The mixture is then heated to 70 to 80 degrees centigrade and ejected through a spreading nozzle. The ejected foaming mixture can then be conveyed to a well ventilated circulating oven where both the rise and the cure of the foam may be accomplished at about 100 to 150 degrees centigrade.

In another method the solution of the alcohol and the mineral acid is injected and mixed into the foaming mixture after the diisocyanate has been mixed with the alkyd resin. The advantage of this system is that the mixing zone can be operated at temperatures considerably higher than 60 degrees centigrade without premature expansion of the foaming mixture.

Various additives can be incorporated which may serve to provide different properties. For instance, antimony oxide can be used to improve fire-resistance; fillers, such as clay, calcium sulfate or ammonium phosphate may be added to lower cost, and improved density and fire-resistance; ingredients such as dyes may be added for color, and fibrous glass, asbestos, or synthetic fibers may be added for strength. Plasticizers such as MPS–500, a mixture of methylpentachlorostearate and epoxidized soy bean oil, may also be added to obtain desired properties.

The following will serve to illustrate the present invention and the improvements resulting therefrom.

EXAMPLE 1

A combined-chlorine-containing resin was prepared in the following manner: a five-liter three-necked flask was immersed in an oil bath which was equipped with an agitator, a thermometer, and nitrogen inlet tube leading into the reaction mixture. A ten-inch column packed with glass helices was installed in one neck of the flask and connected to a water-cooled condenser. Six hundred ninety-nine and nine-tenths grams of glycerol were placed in the reactor and the agitator started. After preheating the glycerol to 100 degrees centigrade, nitrogen was passed through the reactor at a rate of 0.01 to 0.02 cubic feet per minute. Then 1555.5 grams of HET acid (1,4,5,6,7,7 - hexachlorobicyclo - (2.2.1) - 5 - heptene-2,3-dicarboxylic acid) and 292.3 grams of adipic acid were charged into the reaction flask. Heating and stirring were continued and the temperature of the reaction mixture was gradually raised to 158 to 160 degrees centigrade over a period of 1 to 1¼ hours. After maintaining the reaction for an additional 1¼ hours at 158 to 160 degrees centigrade, the nitrogen flow was increased to 0.03 cubic foot per minute. The conditions were maintained at 158 to 160 degrees centigrade for five hours, and then the nitrogen flow was increased to 0.05 cubic foot per minute for an additional 8½ hours. At the end of this time the acid number of the resin was 16. In order to lower the acid number, a vacuum of 100 to 200 milliliters was applied at the reaction temperature of 158 to 160 degrees centigrade for 1 to 3½ hours. The resulting amber-colored resin solidified when poured into a large flat pan, and was allowed to cool to room temperature. The resin had an acid number of 5.6, a water content of 0.08 percent, and a density of 1.5 grams per cubic centimeter.

EXAMPLE 2

Twenty grams of an alkyd as produced above in Example 1, and 4.0 grams of MPS–500 were weighed into a 125 cc. beaker and heated on a hotplate while stirring with a thermometer until the mixture was completely fluid and homogeneous. The temperature of this mixture was adjusted to about 107 degrees centigrade. Then 12.6 grams of Nacconate 80, which had been kept at room temperature, was added and the mixture stirred for 3½ minutes. The mixture became homogeneous in about 1½ minutes. The temperature gradually dropped from 85 to 70 degrees centigrade. At the end of this time 1.8 cc. of t-amyl alcohol solution containing three drops of concentrated sulfuric acid was added and the mixture stirred and cooled to 50 degrees centigrade in a water bath. The creamy viscous mixture was maintained at this temperature for 15 minutes with stirring. During this time the mixture thickened into a pasty mass. It was then heated with stirring to 80 degrees centigrade over a one to two minute period. The resulting fluid, creamy mass was poured into a 16 ounce paper cup and the cup placed in a circulating oven at 120 degrees centigrade for one hour. The foam rose to its maximum height in five to ten minutes and was fully cured in 30 to 50 minutes. The foam consisted of small uniform cells, had a density of 2.9 to 3.1 pounds per cubic foot, and a compressive yield of 20 to 30 pounds per square inch.

EXAMPLE 3

An alkyd was prepared as described in Example 1 with the exception that 740.0 grams of HET acid, 555.0 grams of adipic acid and 699.9 grams of glycerol were used. Twenty grams of this alkyd were then weighed into a 125 cc. beaker and heated on a steam bath until completely fluid. The alkyd was then diluted with 3.2 cc. of t-butyl alcohol. After thorough mixing, 16.0 grams of Nacconate 80 was added and the mixture made compatible by stirring at 55 to 60 degrees centigrade over a 10 to 15 minute period. As soon as the mixture became homogeneous, three drops of concentrated sulfuric acid was added and rapidly mixed in. After a few minutes of additional stirring, the creamy mixture was poured into a cardboard container and heated at 120 degrees centigrade for one hour. The foam had a good cell structure and a density of 1.8 pounds per cubic foot.

In the examples shown in the following table, an alkyd resin such as produced in Example 1 was used to produce rigid foams in a manner similar to Example 2, except that various other tertiary alcohols noted in the table were used as the foaming agent. In every case three drops of concentrated sulfuric acid were used as a catalyst for the blowing reaction. In each case 20.0 grams of alkyd resin and 12.6 grams of Nacc600ate 80 were used.

Table I

| Example No. | Blowing Agent | Amount | Density, Lbs. Per Cubic Foot |
|---|---|---|---|
| 4 | 2-methyl-2,4-pentane diol | 1.97 g | 3.5 |
| 5 | 3,5-dimethyl-4-octyne-3,5-diol | 2.8 g | 5.9 |
| 6 | 1-phenyl-2-methyl-2-propanol | 2.8 cc | 4.5 |
| 7 | 1-benzyl-1-cyclohexanol | 2 cc | 10.2 |

The examples in Table II below show the preparation of fire-resistant foams using various catalysts. In each case 20 grams of the alkyd described above in Example 1 were mixed with four grams of MPS 500 and the amount of NaccGerman 80 indicated in the table. The mixture in each case was stirred at 70 to 80 degrees centigrade until compatible, cooled to the holding temperature, at which point 1.8 cc. of t-amyl alcohol containing the acid catalyst was added. The phosphoric acid was prepared by adding solid phosphorus pentoxide to 85 percent phosphoric acid until there was an excess of solid. This syrupy liquid was then decanted off and used as in Example 3.

Table II

| Example No. | Nacconate 80/20 g. of Alkyd | Catalyst | Density, lbs./Foot³ |
| --- | --- | --- | --- |
| | G. | | |
| 8 | 13.7 | Conc H₃PO₄ (3 drops) | 2.6 |
| 9 | 12.6 | Conc H₂SO₄ (3 drops) | 3.5 |
| 10 | 12.6 | 0.2 g. p-toluene sulfonic acid | 3.4 |
| 11 | 12.6 | 0.16 g. AlCl₃ | 4.7 |
| 12 | 10.5 | 0.6 g. of picric acid | 2.7 |
| 13 | 10.5 | Conc HCl (6 drops) | 2.2 |
| 14 | 10.5 | Conc HNO₃ (5 drops) | 4.9 |

The following example illustrates the use of the blowing agent of the present invention with a non-halogen-containing alkyd resin.

EXAMPLE 15

The alkyd resin used in this example was Selectron 5922, a proprietary alkyd produced by Pittsburgh Plate Glass Company and comprising the condensation product of 5 moles of adipic acid, one mole phthalic anhydride, and 7.6 moles glycerol. Water was removed from 53.5 grams of Selectron 5922 by heating the resin at 100 to 105 degrees centigrade at a pressure of 0.1 millimeter for 2½ hours. This treatment reduced the water content of the resin from 0.89 percent to 0.08 percent while the acid number remained essentially unchanged (41–43).

A portion of this dried resin (20.0 g.) was placed into a beaker and stirred with a thermometer and heated until the temperature reached 100 degrees centigrade. A solution of 0.3 gram of Aerosol O T (dioctyl sulfosuccinate produced by American Cyanamid Co.) in 1.8 cc. of tertiary amyl alcohol was then added followed by 19.8 grams of Nacconate 80, and the mixture stirred rapidly at 70 to 90 degrees centigrade for three minutes to give a homogeneous viscous liquid. Three drops of concentrated sulfuric acid was then added and the mixture stirred vigorously for an additional 30 seconds to give a thick creamy mixture which was poured into a paper container. The foam was expanded and cured by heating at 115 degrees centigrade to give a rigid product with a very fine cell structure and a density of 5.8 pounds per cubic foot.

Although we have described the invention designating polycarboxylic acids, any polycarboxylic compound which is equivalent in function may be employed e. g. anhydrides, acid chlorides, esters, etc.

Other variations of the present invention may be practised by those skilled in the art without departing from the spirit and scope thereof, except as limited by the appended claims.

We claim:

1. A composition of matter comprising: (A) an alkyd resin comprised of the reaction product of (1) a polycarboxylic compound selected from the group consisting of a polycarboxylic acid, a polycarboxylic acid anhydride, a polycarboxylic acid halide and a polycarboxylic acid ester and (2) a polyhydric alcohol; (B) an organic polyisocyanate in an amount from 30 to 130 percent based on the number of hydroxyl and carboxyl groups; and (C) a foaming agent comprised of (1) a tertiary alcohol having the general structural formula:

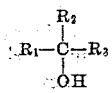

where R₁ is an aliphatic group containing at least one hydrogen atom bonded to the carbon atom immediately adjacent to the carbinol group, and R₂ and R₃ are substituents selected from the group consisting of aliphatic and aromatic groups; and (2) an amount up to 1.5 percent of a strong, concentrated acid.

2. A composition according to claim 1 wherein said polycarboxylic compound is a Diels-Alder adduct of hexachlorocyclopentadiene.

3. A composition according to claim 2 wherein said tertiary alcohol is tertiary butyl alcohol.

4. A composition according to claim 2 wherein said tertiary alcohol is tertiary amyl alcohol.

5. A composition according to claim 2 wherein said tertiary alcohol is 2-methyl-2,4-pentane diol.

6. A composition according to claim 2 wherein said concentrated acid is a Lewis-type acid.

7. A composition according to claim 2 wherein said acid is concentrated sulfuric acid.

8. A composition according to claim 2 wherein said acid is phosphoric acid.

9. A composition according to claim 2 wherein said concentrated acid is a strong mineral acid.

10. A composition according to claim 9 wherein said polyhydric alcohol is glycerol.

11. A composition according to claim 9 wherein said alkyd resin (A) is a reaction product comprised of: (1) 1,4,5,6,7,7 - hexachlorobicyclo-(2.2.1)-5-heptene-2,3-dicarboxylic acid; (2) adipic acid; and (3) glycerol.

12. A process for the production of a polyurethane foam which comprises mixing together (A) an alkyd resin comprised of the reaction product of (1) a polycarboxylic compound selected from the group consisting of a polycarboxylic acid, a polycarboxylic acid anhydride, a polycarboxylic acid halide, and a polycarboxylic acid ester and (2) a polyhydric alcohol, (B) an organic polyisocyanate in an amount from about 30 to 130 percent based on the number of hydroxyl and carboxyl groups, and (C) a foaming agent comprised of (1) a tertiary alcohol having the general formula:

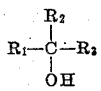

where R₁ is an aliphatic group containing at least one hydrogen atom bonded to the carbon atom immediately adjacent to the carbinol group, and R₂ and R₃ are substituents selected from the group consisting of aliphatic and aromatic groups; and (2) a strong, concentrated acid in an amount up to 1.5 percent; foaming the mixture at an elevated temperature, and curing the resulting product.

13. A process according to claim 12 wherein said polycarboxylic compound is a Diels-Alder adduct of hexachlorocyclopentadiene.

14. A process according to claim 13 wherein said tertiary alcohol is tertiary butyl alcohol.

15. A process according to claim 13 wherein said tertiary alcohol is tertiary amyl alcohol.

16. A process according to claim 13 wherein said tertiary alcohol is 2-methyl-2,4-pentane diol.

17. A process according to claim 13 wherein said concentrated acid is a Lewis-type acid.

18. A process according to claim 13 wherein said tertiary alcohol is tertiary amyl alcohol and said strong concentrated acid is sulfuric acid.

19. A process according to claim 13 wherein said tertiary alcohol is tertiary butyl alcohol and said strong concentrated acid is sulfuric acid.

20. A process according to claim 13 wherein said concentrated acid is a strong mineral acid.

21. A process according to claim 20 wherein said polyhydric alcohol is glycerol.

22. A process according to claim 20 wherein said alkyd resin (A) is a reaction product comprised of: (1) 1,4,5,6,7,7 - hexachlorobicyclo - (2.2.1) - 5 - heptene-2,3-dicarboxylic acid; and glycerol.

(References on following page)

References Cited in the file of this patent

UNITED STATES PATENTS

| | | |
|---|---|---|
| 2,181,640 | Deanesly et al. | Nov. 28, 1939 |
| 2,577,280 | Simon et al. | Dec. 4, 1951 |

OTHER REFERENCES

R. C. Fuson: "Advanced Organic Chemistry," pages 87 and 88, published by John Wiley & Sons Inc., copyright 1950.